(12) United States Patent
Takagi et al.

(10) Patent No.: US 6,340,174 B1
(45) Date of Patent: Jan. 22, 2002

(54) AIRBAG APPARATUS

(75) Inventors: Takeshi Takagi; Toshihiro Ishikawa, both of Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/603,346

(22) Filed: Jun. 26, 2000

(30) Foreign Application Priority Data

Jul. 12, 1999 (JP) .......................................... 11-198147

(51) Int. Cl.⁷ ................................................ B60R 21/26
(52) U.S. Cl. ........................ 280/736; 280/740; 280/742
(58) Field of Search ................................ 238/736, 740, 238/741, 742, 737, 728.1, 728.2, 732, 739

(56) References Cited

U.S. PATENT DOCUMENTS

| | | | |
|---|---|---|---|
| 5,069,480 A | * 12/1991 | Good | 280/732 |
| 5,172,933 A | * 12/1992 | Strasser | 280/740 |
| 5,209,510 A | * 5/1993 | Mamiya | 280/732 |
| 5,209,511 A | * 5/1993 | Morita | 280/743.1 |
| 5,308,108 A | * 5/1994 | Rion | 280/728.2 |
| 5,332,256 A | * 7/1994 | Lauritzen et al. | 280/728.2 |
| 5,407,226 A | * 4/1995 | Lauritzen et al. | 280/728.1 |
| 5,458,364 A | * 10/1995 | Mueller et al. | 280/728.2 |
| 5,470,105 A | * 11/1995 | Rose et al. | 280/740 |
| 5,634,657 A | * 6/1997 | Rose et al. | 280/728.2 |
| 5,707,078 A | * 1/1998 | Swanberg et al. | 280/739 |
| 5,752,715 A | * 5/1998 | Pripps et al. | 280/740 |
| 5,775,730 A | 7/1998 | Pripps et al. | |
| 5,779,265 A | * 7/1998 | Rose et al. | 280/736 |

FOREIGN PATENT DOCUMENTS

| | | |
|---|---|---|
| DE | 43 08 387 | 9/1993 |
| DE | 195 06 886 | 8/1996 |
| DE | 197 56 977 | 7/1999 |
| JP | 8-11659 | 1/1996 |
| WO | WO 99 28163 | 6/1999 |

* cited by examiner

*Primary Examiner*—Brian L. Johnson
*Assistant Examiner*—Faye M. Fleming

(57) ABSTRACT

A rectifying plate (53) is inserted between gas outlets of a first inflator (51*a*) and/or a second inflator (51*b*) and a diffuser (55), and is formed with a plurality of openings which have different areas and uniform gas flows released from the gas outlets, and the opening area corresponding to the inactive second inflator (51*b*) of the first and second inflators (51*a*, 51*b*) is larger than the opening area corresponding to the active first inflator (51*a*).

13 Claims, 11 Drawing Sheets

AIRBAG APPARATUS

FIELD OF THE INVENTION

The present invention relates to an airbag apparatus which inflates and deploys airbags by uniforming the gas flow even when only some of a plurality of inflators are activated.

BACKGROUND OF THE INVENTION

A conventional airbag apparatus equipped in a vehicle comprises an inflator (gas generator), an airbag which deploys by receiving a gas generated by the inflator upon collision or crash, a storage case which includes a synthetic resin cover member that covers the inflator and the surface side of the airbag, and the like. When collision detection means such as an acceleration sensor or the like detects any collision, the inflator is activated to release a gas into the airbag, and the airbag breaks the cover member and deploys into a passenger room, thus protecting a passenger.

When the airbag inflates by the gas flow released forward from the inflator, the bag surface violently hits the passenger, resulting in a large shock. For this reason, in order to deflect sideways the gas flow released from the inflator, Japanese Patent Laid-Open No. 8-11659 has proposed a technique in which a diffuser that deflects sideways the gas flow released from one inflator is provided to cover a gas inlet so as to suppress the airbag from excessively inflating forward while inflating the airbag quickly in the right-and-left direction.

However, an airbag apparatus which comprises a plurality of inflators can eliminate injury of a passenger resulting from a shock of the airbag that deploys at high speed, by activating some inflators, e.g., when the shock speed is low. As shown in FIG. 11, when a left inflator 151a of two inflators 151a and 151b is activated, the gas flow released from a left opening 155a of a diffuser 155 becomes stronger than that released from a right opening 155b, and an airbag 152 often deploys nonuniformly.

SUMMARY OF THE INVENTION

The present invention has been made in consideration of the aforementioned problems, and has as its object to provide an airbag apparatus which can uniformly deploy an airbag by uniforming and releasing the gas flow even when only some of a plurality of inflators are initiated.

In order to solve the aforementioned problems and to achieve the above object, according to the first invention, since a rectifying member for uniforming the gas flow released from a gas outlet is provided between the gas outlet and a gas flow deflection member, the gas flow can be uniformed and released even when only some of a plurality of inflators are initiated, and an airbag can uniformly deploy without any local offset.

According to the second invention, since the rectifying member has a plurality of openings having different areas, and the opening area corresponding to an inactive inflator is larger than that corresponding to an active inflator to decrease the opening area of the rectifying member on the active inflator side, the gas can easily flow toward the opening of the rectifying member on the inactive inflator side, thus uniforming the gas flow.

According to the third and fifth inventions, since the gas flow deflection member has a plurality of openings which have different areas and are formed on its side portions, and the opening area corresponding to an inactive inflator is larger than that corresponding to an active inflator to decrease the opening area of the gas flow deflection member on the active inflator side, the gas can easily flow toward the opening of the gas flow deflection means on the inactive inflator side, thus uniforming the gas flow.

According to the fourth invention, since the gas flow deflection member breaks upon activating a plurality of inflators, it breaks by the release pressure of the gas and can uniformly release the gas flow toward the airbag.

According to the sixth invention, since the rectifying member comprises a varying member for varying the opening area of the rectifying member, and the varying member moves to change the area of a gas outlet so as to reduce the opening area of the rectifying member on the active inflator side, the gas can easily flow toward the opening of the rectifying member on the inactive inflator side, thus uniforming the gas flow to the airbag.

According to the seventh invention, since the varying member comprises a varying plate which is moved by the gas flow to vary the opening area of the rectifying member, and the varying plate moves to change the area of the gas outlet to reduce the opening area of the rectifying member on the active inflator side, the gas can easily flow toward the opening of the rectifying means on the inactive inflator side, thus uniforming the gas flow toward the airbag.

According to the eighth invention, since uniforming means for uniforming the gas flow released from a gas outlet is provided between the gas outlet and gas flow deflection means, the gas flow can be uniformed and released even when only some of a plurality of inflators are initiated, and an airbag can uniformly deploy without any local offset.

According to the ninth invention, in the informing means, since the area of an opening, corresponding to an inactive inflator, of a plurality of openings formed on side portions of the gas flow deflection means is smaller than that corresponding to an active inflator so as to reduce the opening area of the uniforming means on the active inflator side, the gas can easily flow toward the opening of the rectifying means on the inactive inflator side, thus uniforming the gas flow toward the airbag.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

An embodiment of the present invention will be described in detail hereinafter with reference to the accompanying drawings.

This embodiment will explain an example in which the present invention is applied to a passenger-seat airbag apparatus equipped in a dashboard in a passenger room.

Figure 1:
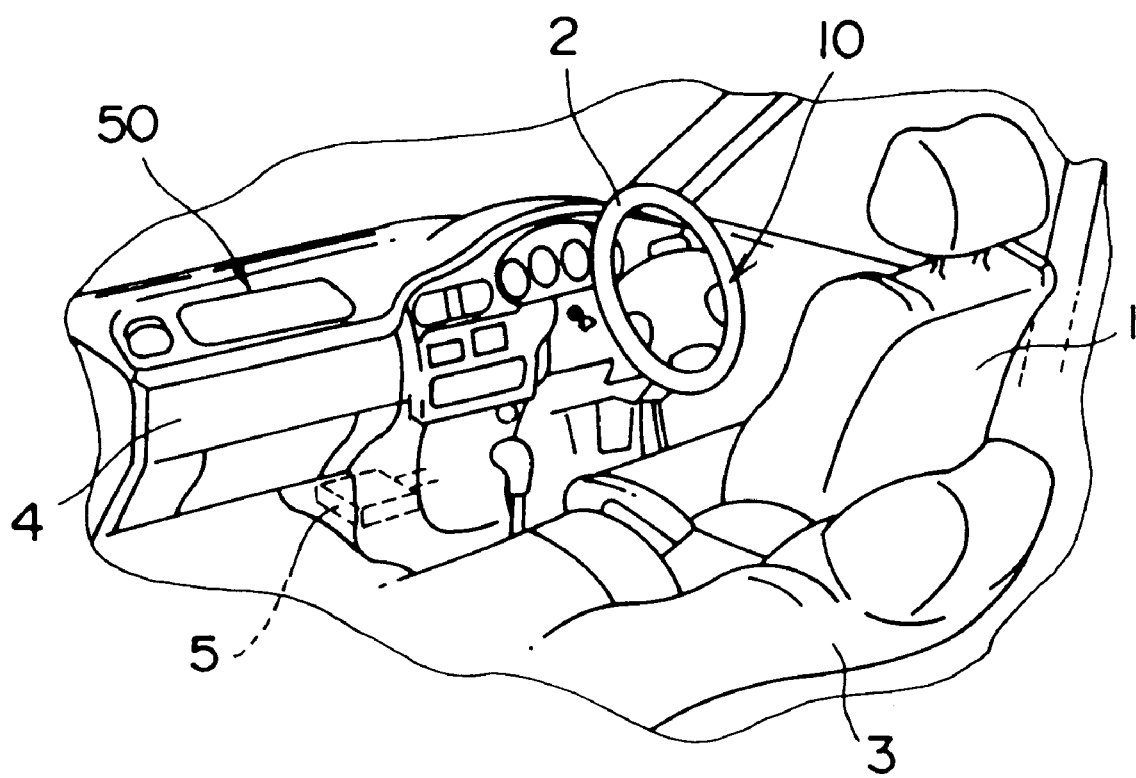
FIG. 1 is a perspective view of principal part viewed from the passenger room of a vehicle equipped with an airbag apparatus according to an embodiment of the present invention.
Figure 2:
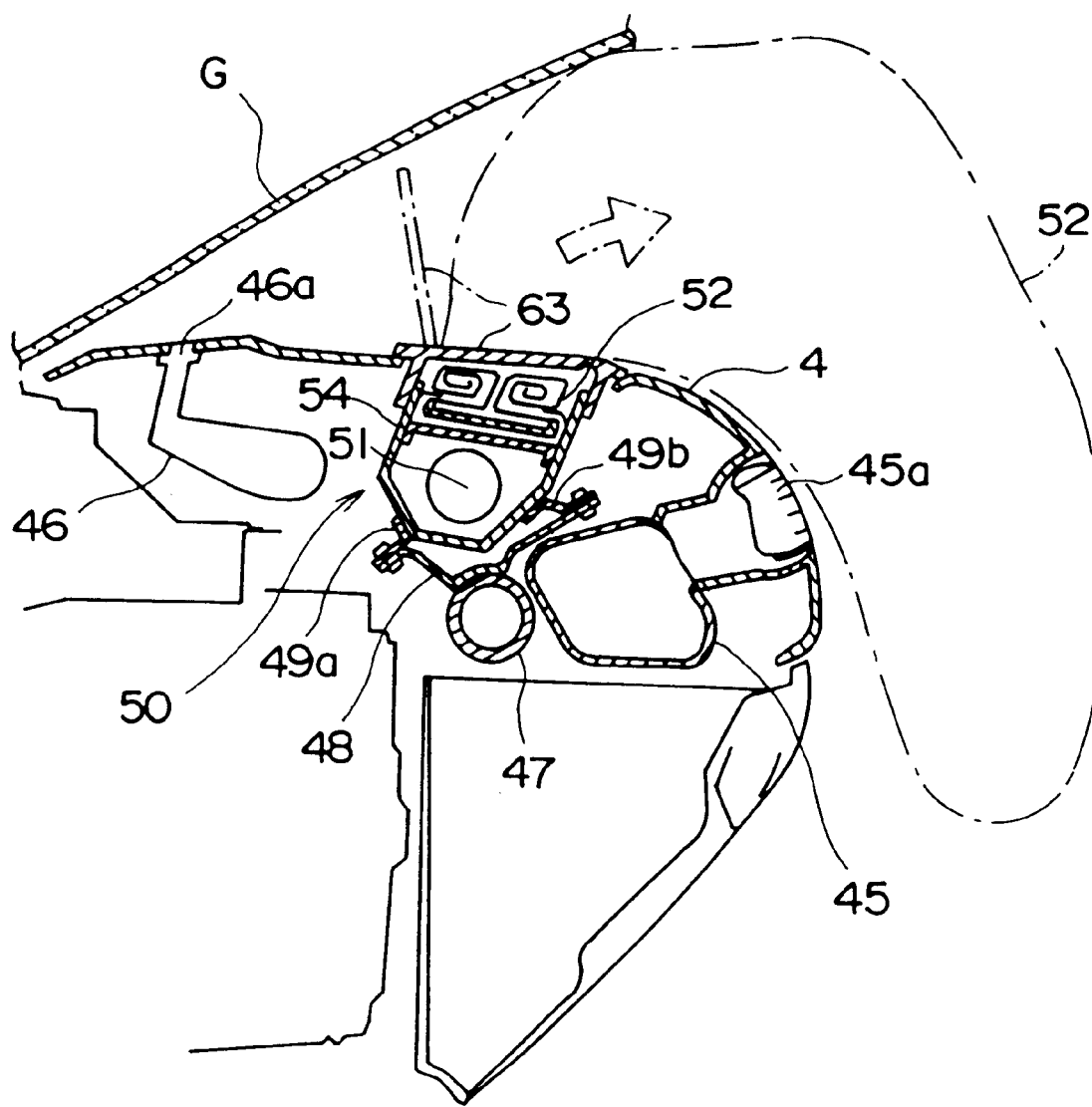
FIG. 2 is a longitudinal sectional view of a dashboard which includes a passenger-seat airbag apparatus.
Figure 3:
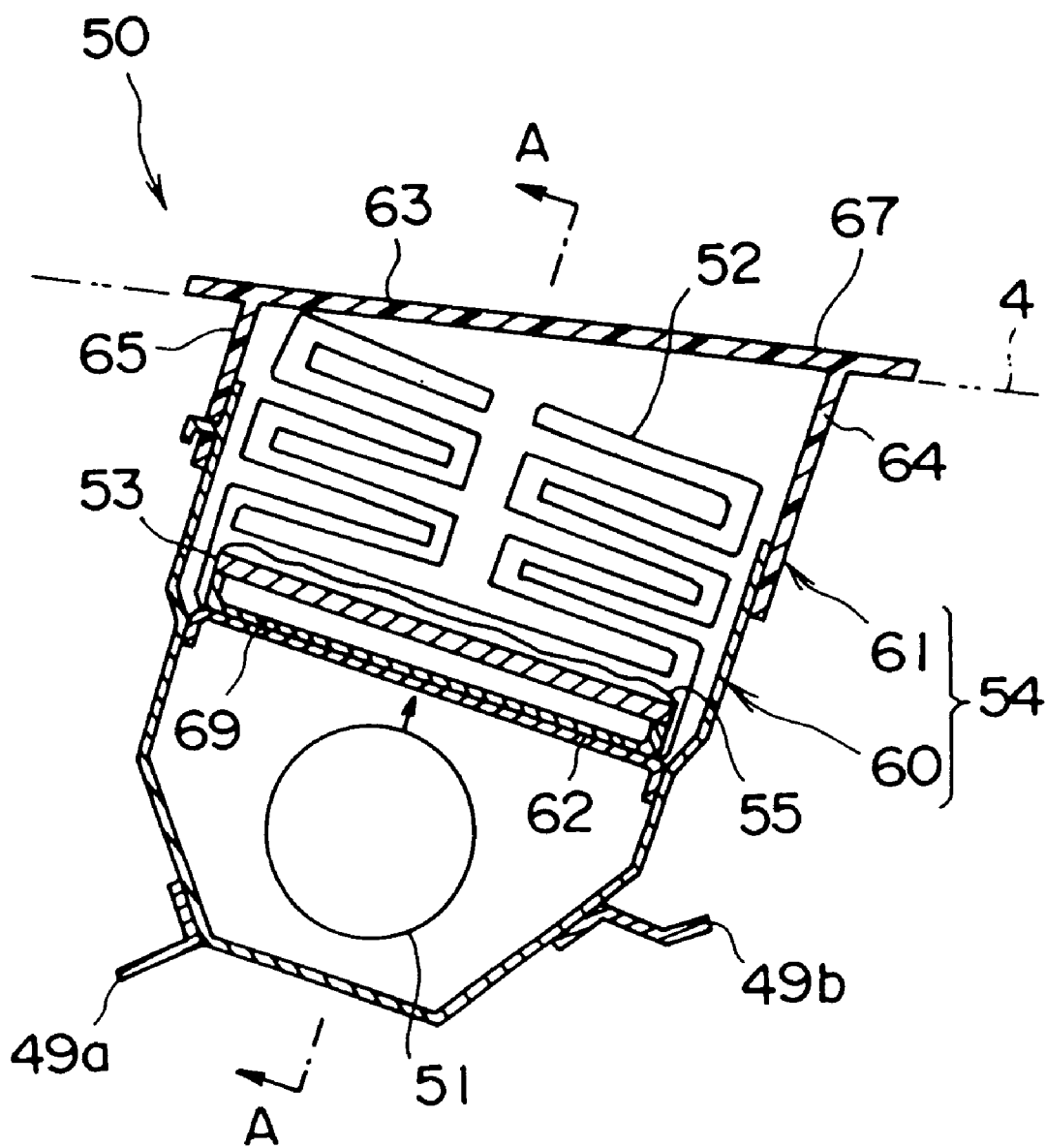
FIG. 3 is a longitudinal sectional view of the passenger-seat airbag apparatus.
Figure 4:
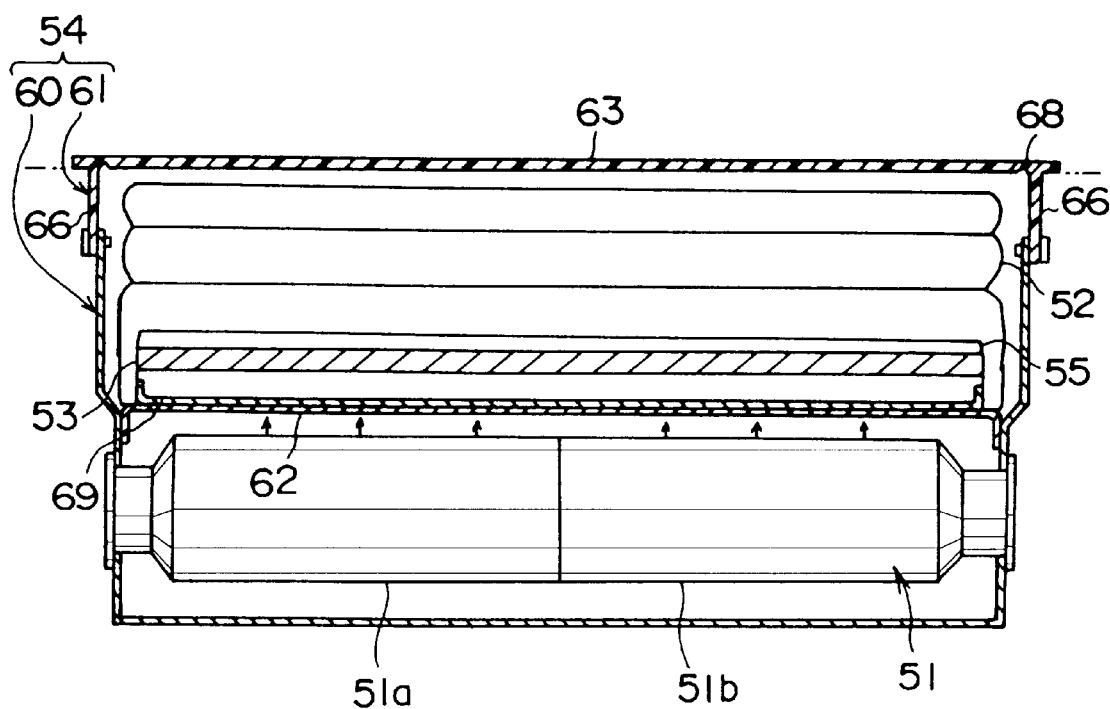
FIG. 4 is a sectional view taken along a line A—A in FIG. 3.
Figure 5:
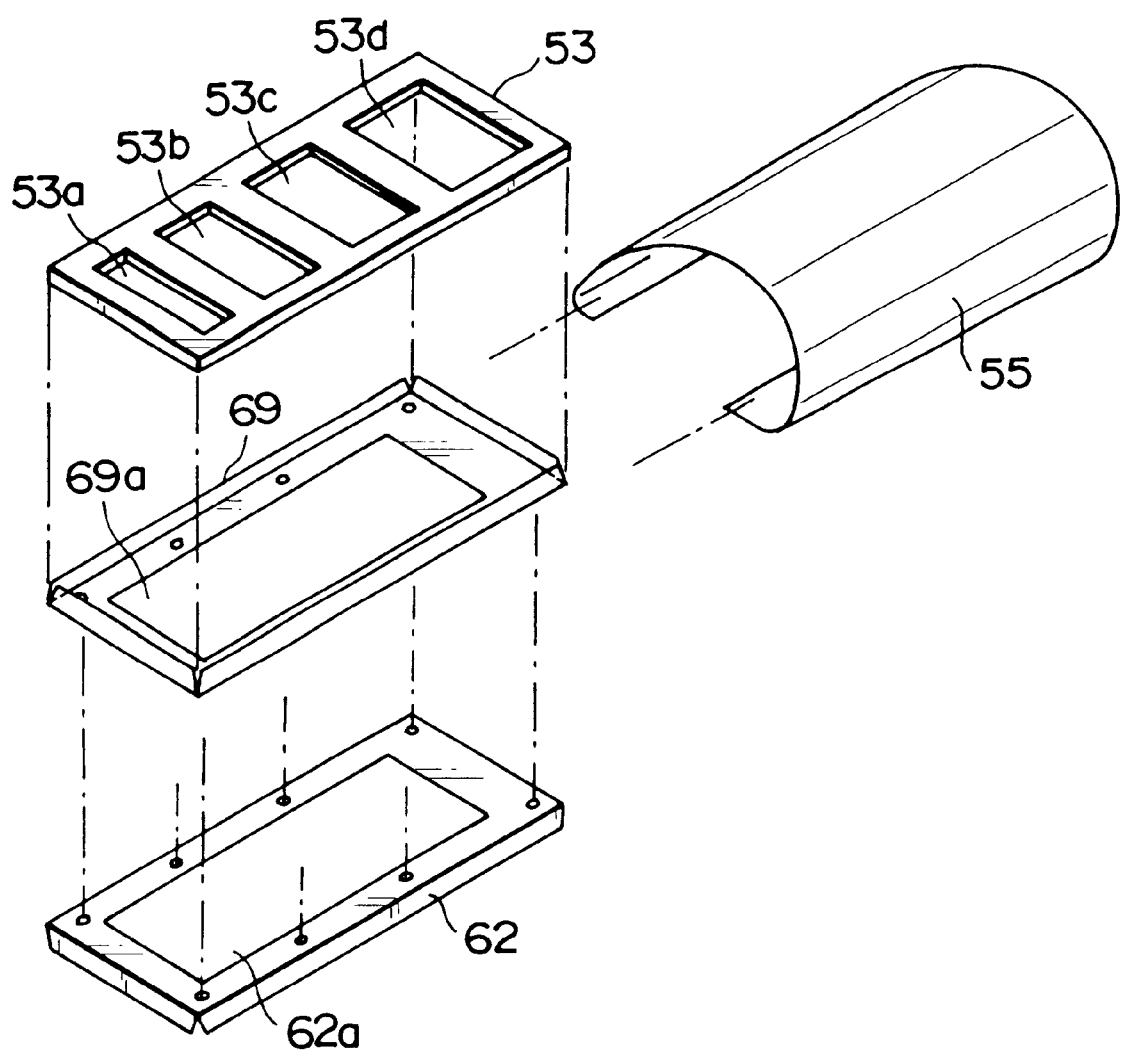
FIG. 5 is an exploded view of a rectifying plate, diffuser, partitioning plate, and pressing plate in FIG. 4.

FIG. 1 is a perspective view of principal part viewed from the passenger room of a vehicle equipped with an airbag apparatus of this embodiment. FIG. 2 is a longitudinal sectional view of a dashboard which includes a passenger-seat airbag apparatus. FIG. 3 is a longitudinal sectional view of the passenger-seat airbag apparatus. FIG. 4 is a sectional view taken along a line A—A in FIG. 3. FIG. 5 is an exploded view of a rectifying plate, diffuser, partitioning plate, and pressing plate in FIG. 4.

As shown in FIG. 1, an airbag apparatus of this embodiment is applied especially as a passenger-seat airbag apparatus 50, which is equipped in a dashboard 4 in front of a passenger's seat 3. A driver-seat airbag apparatus 10 is equipped in a steering wheel 2 in front of a driver's seat 1. A controller 5 for controlling these two airbag apparatuses 10 and 50 is provided under the dashboard 4.

As shown in FIGS. 2 to 5, an air-conditioning duct 45 on the passenger room side and an air-conditioning duct 46 on the vehicle front side are provided inside the dashboard 4 that faces front glass G, and a storage case 54 of the air-bag apparatus 50 is fixed to an attachment member 48 extending from a pipe-like instrumental panel member 47 via brackets 49a and 49b. Note that outlets 45a and 46a which respectively communicate with the air-conditioning ducts 45 and 46 are formed in the dashboard 4.

The passenger-seat airbag apparatus 50 comprises an inflator 51, an airbag 52 which deploys by a gas generated upon initiating the inflator 51, a rectifying plate 53 which uniforms the gas released from the inflator 51, a case 54 that houses the inflator 51, airbag 52, and rectifying plate 53, and a diffuser 55 serving as gas flow deflection means for guiding (deflecting) the gas released from the inflator 51 in the right-and-left direction.

The storage case 54 has a metal case member 60 which is fixed to the attachment member 48 via the brackets 49a and 49b and is elongated in the right-and-left direction, and a synthetic resin cover member 61 which covers the opening of the dashboard 4 and bursts open upon deploying the airbag 52. Inside the case member 60, a partitioning plate 62 which has a substantially rectangular shape elongated in the right-and-left direction is fixed. In the storage case 54, the inflator 51 is stored below the partitioning plate 62, and the airbag 52, rectifying plate 53, and diffuser 55 are stored above the partitioning plate 62.

The cover member 61 has an upper wall portion 63 that faces the upper surface side of the dashboard 4, and side wall portions 64 to 66 which are contiguous with the upper wall portion 63. The lower end portion of the cover member 61 fits on the case member 60, for example, the front and rear side wall portions 64 and 65 engage with the case member 60, and the right and left side wall portions 66 are coupled to the case member 60 by rivets.

On the upper wall portion 63, a separation line 67 is formed along the front side wall portion 64, and separation lines 68 are formed along the right and left side wall portions 66. Upon deploying the airbag 52, the upper wall portion 63 bursts open upper rearward in a single-swing pattern along the separation lines 67 and 68. The separation lines 67 and 68 are formed on the upper wall portion 63 by forming grooves on the lower surface side.

The inflator 51 is of dual type, i.e., consists of first and second inflators 51a and 51b, which are juxtaposed in the right-and-left direction, and respectively have cylindrical cases that store a gas generation agent and are fixed inside the storage case 60.

Upon detecting a collision of a vehicle, the controller 5 energizes the first inflator 51a and/or the second inflator 51b in accordance with that collision speed or the like to fire the gas generation agent, thus generating a gas flow. The gas flow is released from a plurality of gas outlets (not shown) formed on the outer circumferential surface of the cylindrical case.

The airbag 52 is made up of, e.g., a soft synthetic resin film member, and is formed so that its size in the up-and-down direction is larger than that in the right-and-left direction upon deploying. A bag-shaped open end portion of the airbag 52 is clamped by the outer edge portions of the rectifying plate 53, the diffuser 55, the partitioning plate 62, and a pressing plate 69. Openings 62a and 69a for guiding the gas released from the first inflator 51a and/or the second inflator 51b into the airbag 52 are formed in the partitioning plate 62 and pressing plate 69.

Figure 6:
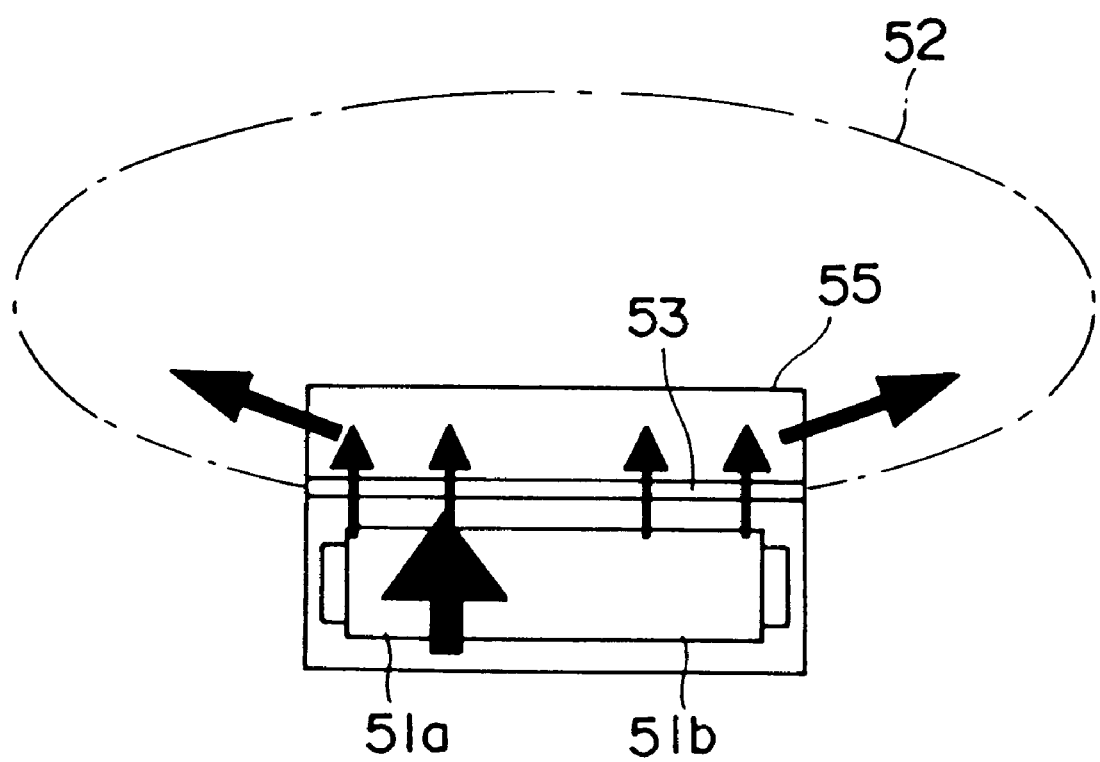
FIG. 6 is a view for explaining the operation and effect of the airbag apparatus of the embodiment of the present invention.

As also shown in FIG. 6, the rectifying plate 53 is provided between the gas outlets of the first inflator 51a and/or the second inflator 51b, and the diffuser 55, and is formed with a plurality openings 53a to 53d having different areas for uniforming the gas flow released from the gas outlets. For example, the opening area corresponding to the inactive second inflator 51b of the first and second inflators 51a and 51b is larger than that corresponding to the active first inflator 51a.

In this manner, when the first inflator 51a alone of the first and second inflators 51a and 51b is activated, since the opening of the rectifying plate 53 on the active inflator side is formed to have a smaller area, the gas can easily flow toward the opening of the rectifying plate 53 on the inactive inflator side, thus uniforming the gas flow to the diffuser 55. When both the first and second inflators 51a and 51b are activated, the gas flow becomes nonuniform due to the presence of the rectifying plate 53. However, in this case, since the airbag is required to deploy at high speed, such nonuniformity does not pose any serious problem.

Figure 7:
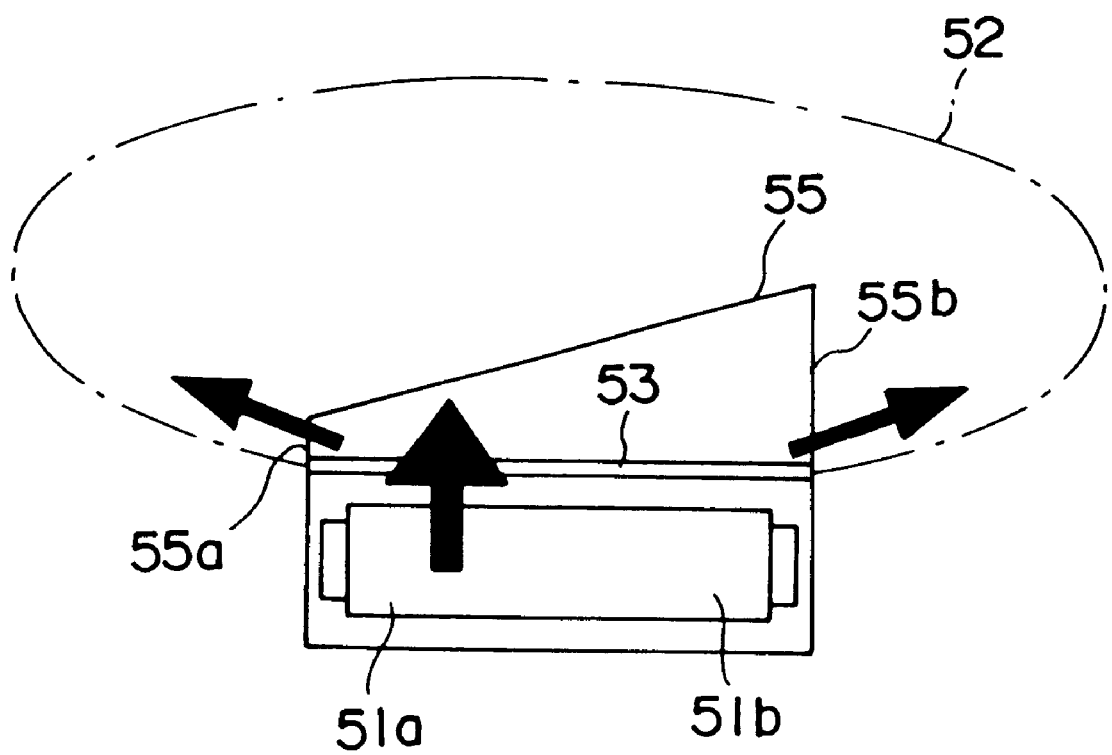
FIG. 7 is a view for explaining the operation and effect of the airbag apparatus of the embodiment of the present invention.

Also, the rectifying plate 53 in FIG. 6 is provided, a plurality of openings 55a and 55b which have different areas are formed on side portions of the diffuser 55, as shown in FIG. 7, and the opening area corresponding to the inactive second inflator 51b of the first and second inflators 51a and 51b is larger than that corresponding to the active first inflator 51a.

Figure 8:
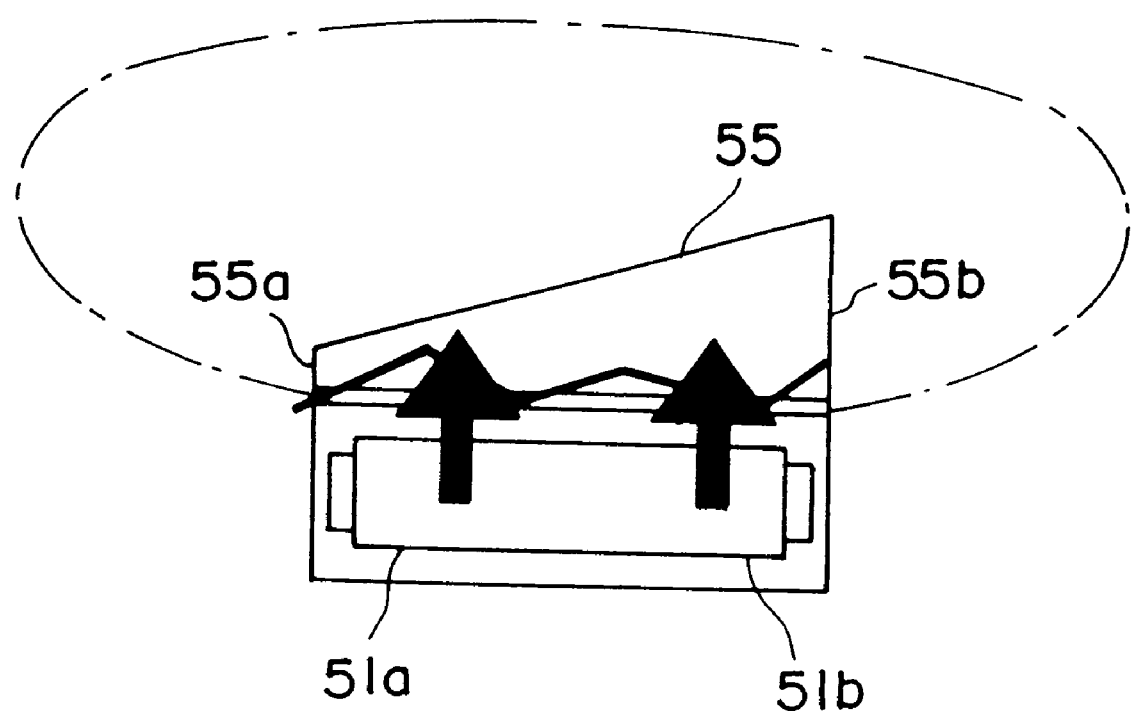
FIG. 8 is a view for explaining the operation and effect of the airbag apparatus of the embodiment of the present invention.

With this structure, when the first inflator alone of the first and second inflators 51a and 51b is activated, since the opening of the diffuser 55 on the active inflator side is formed to have a smaller area, the gas can easily flow toward the opening of the diffuser 55 on the inactive inflator side, thus uniforming the gas flow to the airbag. When both the first and second inflators 51a and 51b are activated, a perforated line or the like may be formed in the diffuser 55, as shown in FIG. 8, so that the diffuser breaks by the gas release pressure, thus uniformly releasing the gas flow toward the airbag.

Figure 9:
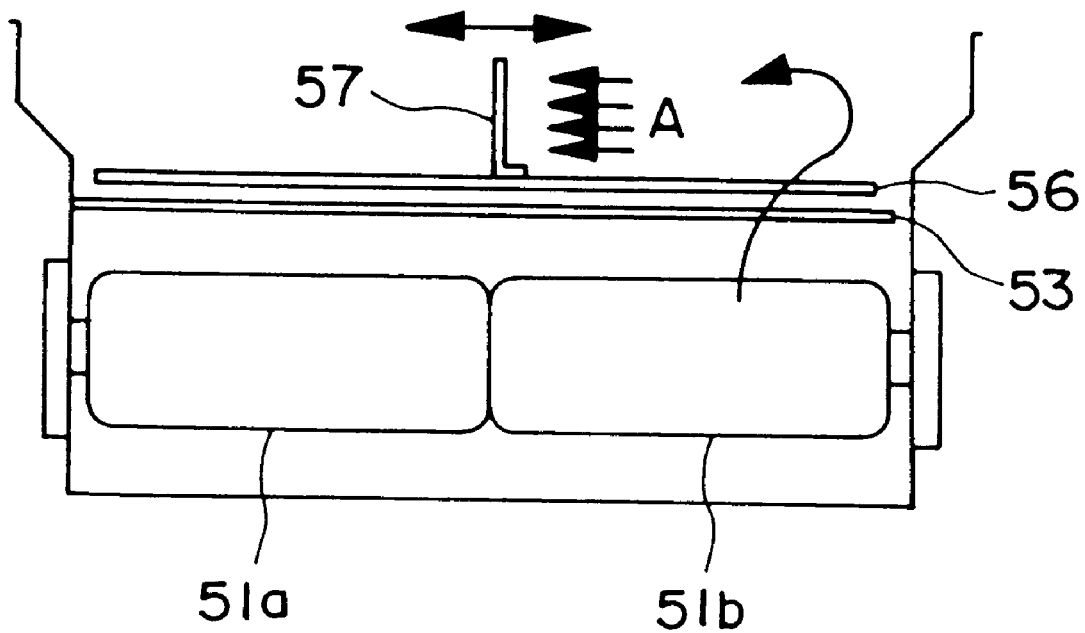
FIG. 9 is a view showing an airbag apparatus according to a modification of the embodiment of the present invention.
Figure 10A:
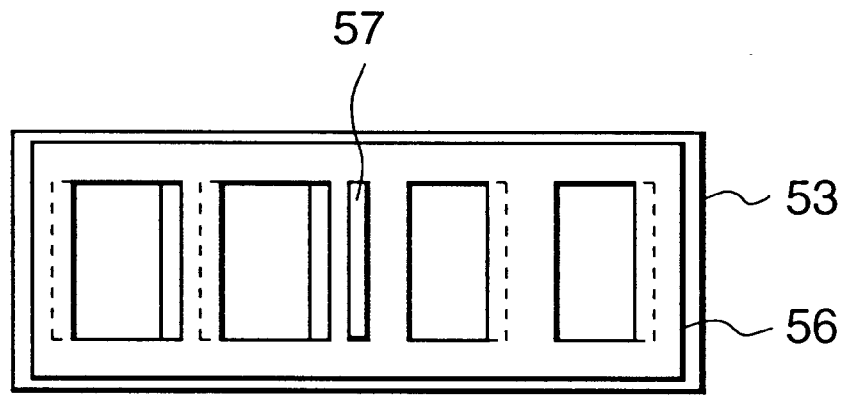
FIGS. 10A and 10B are views for explaining the operation and effect of the airbag apparatus of the modification of the embodiment of the present invention.
Figure 10B:
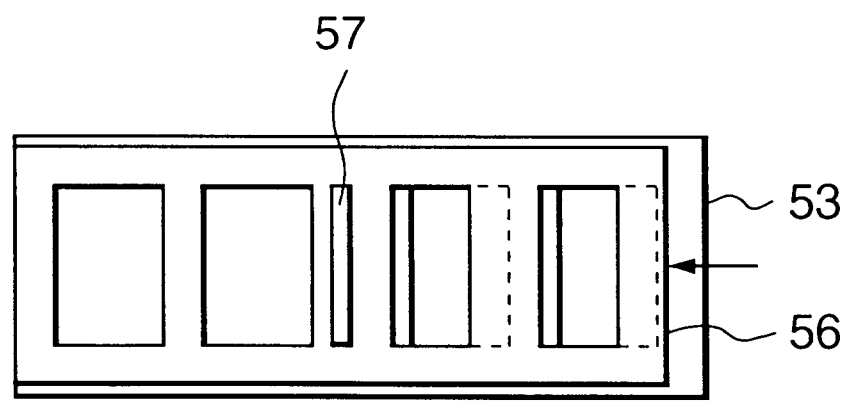
Figure 11:
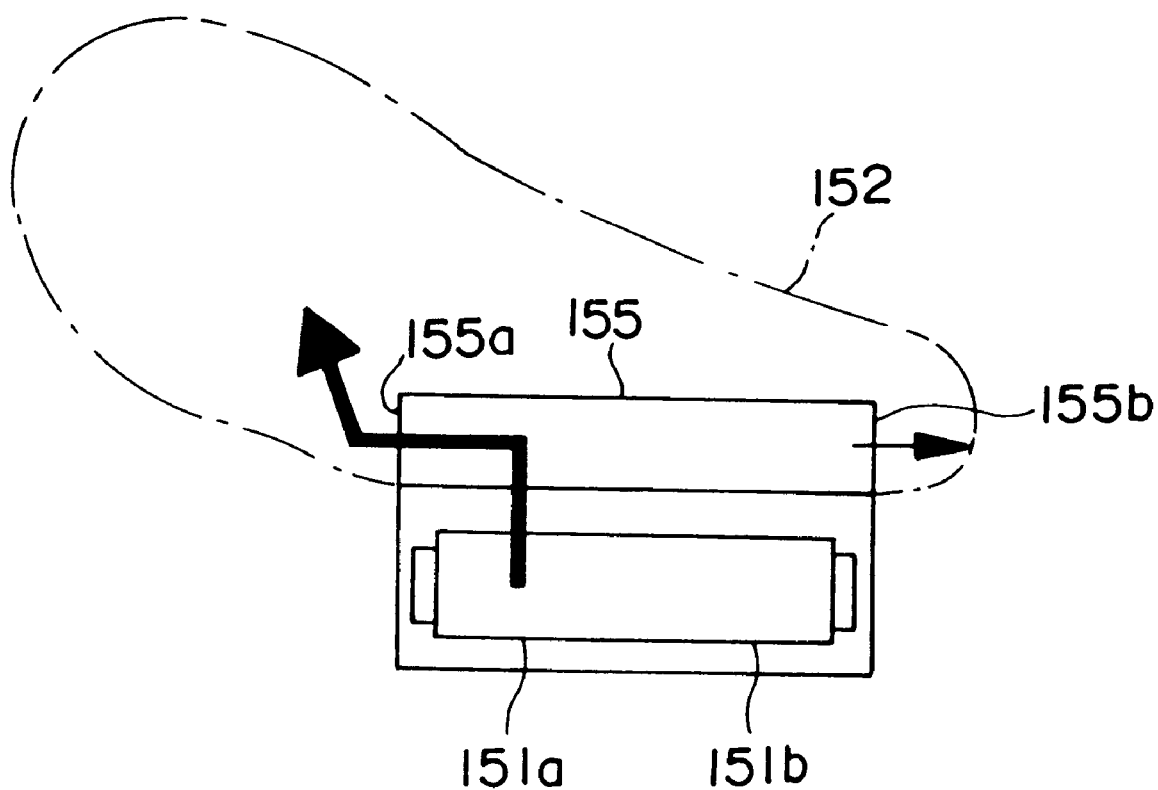
FIG. 11 is a view for explaining the operation of a conventional airbag apparatus.

As a modification of this embodiment, as shown in FIG. 9, a varying plate 56 for changing the opening area of the rectifying plate 53 formed with a plurality of openings having the same area is provided between the rectifying plate 53 and the diffuser 55. When the second inflator 51b is activated from the right-and-left even state of the rectifying plate 53 and varying plate 56 shown in FIG. 10A, and its gas flow A pushes a blade 57 that projects at the center of the varying plate 56 leftward to slide the varying plate 56, the opening area of the rectifying plate 53 on the active inflator side is reduced, as shown in FIG. 10B. As a result, the gas can easily flow toward the opening of the rectifying plate 53 on the inactive inflator side, thus uniforming the gas flow to the airbag.

Note that the present invention can be applied to a modification or change of the above embodiment without departing from the scope of the invention.

The present invention can also be applied to a driver-seat airbag apparatus in addition to the passenger-seat airbag apparatus. The number of inflators is not limited to two, and three or more inflators may be provided.

The present invention is not limited to the above embodiments and various changes and modifications can be made within the spirit and scope of the present invention. Therefore, to apprise the public of the scope of the present invention the following claims are made.

What is claimed is:

1. An airbag apparatus, which has a plurality of inflators and deploys an airbag by changing activation states of said inflators, the inflators being disposed adjacently in the direction vertical to the deploying direction of the airbag, comprising:
   a gas flow deflection member which is provided on the downstream of gas outlets of said inflators and deflects directions of gas flows from said inflators sideward; and
   a rectifying member which is inserted between the gas outlets and said gas flow deflection member and uniforms gas flows released from the gas outlets;
   wherein said rectifying member has a plurality of openings having different areas, and the area of the opening corresponding to an inactive inflator is larger than the area of the opening corresponding to an active inflator,
   wherein said gas flow deflection member has a plurality of openings which are formed on side portions thereof and have different areas, and the area of the opening corresponding to an inactive inflator is larger than the area of the opening corresponding to an active inflator, and
   wherein said gas flow deflection member breaks upon activating said plurality of inflators.

2. The apparatus according to claim 1, wherein said rectifying member comprises a varying member that varies an opening area of said rectifying member.

3. The apparatus according to claim 2, wherein said varying member is a varying plate which varies the opening area of said rectifying member upon being moved by the gas flow.

4. An airbag apparatus, which has a plurality of inflators and deploys an airbag by changing activation states of said inflators, the inflators being disposed adjacently in the direction vertical to the deploying direction of the airbag, comprising:
   a gas flow deflection member which is provided on the downstream of gas outlets of said inflators and deflects directions of gas flows from said inflators sideward; and
   a rectifying member which is inserted between the gas outlets and said gas flow deflection member and uniforms gas flows released from the gas outlets,
   wherein said gas flow deflection member breaks upon activating said plurality of inflators.

5. The apparatus according to claim 4, wherein said rectifying member has a plurality of openings having different areas, and the area of the opening corresponding to the inactive inflator is larger than the area of the opening corresponding to the active inflator.

6. The apparatus according to claim 4, wherein said rectifying member comprises a varying member that varies an opening area of said rectifying member.

7. The apparatus according to claim 6, wherein said varying member is a varying plate which varies the opening area of said rectifying member upon being moved by the gas flow.

8. An airbag apparatus, which has a plurality of inflators and deploys an airbag by changing activation states of said inflators, the inflators being disposed adjacently in the direction vertical to the deploying direction of the airbag, comprising:
   gas flow deflection means, provided on the downstream of gas outlets of said inflators, for deflecting directions of gas flows from said inflators sideward; and
   uniforming means, inserted between the gas outlets and said gas flow deflection means, for uniforming gas flows released from the gas outlets,
   wherein said gas flow deflection means breaks upon activating said plurality of inflators.

9. The apparatus according to claim 8, wherein said gas flow deflection means has a plurality of openings which are formed on side portions thereof and have different areas, and the area of the opening corresponding to an inactive inflator is larger than the area of the opening corresponding to an active inflator.

10. The apparatus according to claim 8, wherein said uniforming means comprises a plurality of openings formed on side portions of said gas flow deflection means, and an area of the opening corresponding to an inactive inflator is larger than an area of the opening corresponding to an active inflator.

11. An airbag apparatus, which has a plurality of inflators and deploys an airbag by changing activation states of said inflators, the inflators being disposed adjacently in the direction vertical to the deploying direction of the airbag, comprising:
   a gas flow deflection member which is provided on the downstream of gas outlets of said inflators and deflects directions of gas flows from said inflators sideward; and
   a rectifying member which is inserted between the gas outlets and said gas flow deflection member and uniforms gas flows released from the gas outlets,
   wherein said rectifying member has a plurality of openings having different areas, and the area of the opening corresponding to an inactive inflator is larger than the area of the opening corresponding to an active inflator, and
   wherein said gas flow deflection member has an inclined member of which distance to an inactive inflator is larger than the distance to an active inflator, the inclined member forms a plurality of openings which are formed on side portions thereof and have different areas, and the area of the opening corresponding to an inactive inflator is larger than the area of the opening corresponding to an active inflator.

12. The apparatus according to claim 11, wherein said rectifying member comprises a varying member that varies an opening area of said rectifying member.

13. The apparatus according to claim 12, wherein said varying member is a varying plate which varies the opening area of said rectifying member upon being moved by the gas flow.

* * * * *